Patented Dec. 23, 1947

2,433,323

UNITED STATES PATENT OFFICE 2,433,323

PRODUCTION OF USEFUL CHEMICALS FROM CRUDE FORMIC ACID DISTILLATE

Alfred A. Reiter and Floyd L. Beman, Marquette, Mich., assignors to Cliffs Dow Chemical Company, Marquette, Mich., a corporation of Michigan No Drawing. Application May 5, 1943, Serial No. 485,760

9 Claims. (Cl. 260—541)

This invention concerns a method whereby the formic acid-containing fraction of wood distillate, herein referred to as "crude formic acid distillate," may be treated to recover therefrom acetic acid of good purity and to produce a substantially pure ester of the formic acid.

In the manufacture of acetic acid from wood distillate, a crude mixture of the acidic ingredients is fractionally distilled. The formic acid present in the wood distillate is collected in a fraction which usually contains from 40 to 50 per cent by weight of formic acid, from 10 to 15 per cent of water, and a considerable amount of acetic acid as well as other ingredients of unknown identity. It may be mentioned that this fraction usually contains water even when the crude acid mixture from which it is distilled has previously been dehydrated, indicating that water is formed by decomposition of impurities present in the mixture during the distillation. After removing the formic acid, the distillation is continued to separate the acetic acid product. The formic acid-containing fraction of the distillate, i. e. the "crude formic acid distillate," cannot readily be separated into its components by fractional distillation. Usually, it is marketed as a crude mixed acid product.

It is an object of this invention to provide a method whereby the crude formic acid distillate may be treated to obtain individual products of good purity. A particular object is to provide such method whereby the formic acid may selectively be esterified and be separated in the form of an ester, leaving the acetic acid in a relatively concentrated form capable of purification by distillation. Other objects will be apparent from the following description of the invention.

We have found that by treating the crude formic acid distillate with any of certain alcohols in amount corresponding approximately to the chemical equivalent of the formic acid, or with certain esters of these alcohols and heating the formic acid may selectively be esterfied and the ester product may be fractionally distilled from the mixture to leave the acetic acid in relatively concentrated and readily purifiable form. However, only certain alcohols and esters may satisfactorily be employed to attain these ends.

The alcohols which may satisfactorily be used in the process are methyl alcohol, ethyl alcohol, propyl alcohol, isopropyl alcohol, allyl alcohol, and secondary butyl alcohol. Other alcohols, e. g. n-butyl alcohol, amyl alcohol, hexyl alcohol, etc., tend to form either the acetate instead of the formate, or to form a mixture of ester products, thus preventing a clean-cut removal of the formic acid in ester form and recovery of the acetic acid in good yield and in a form readily purifiable by distillation. In place of these alcohols any ester thereof having a boiling point higher than that of the corresponding ester of formic acid may be used. Examples of esters which may be used as reactants in the process are the esters of any of the above-mentioned alcohols with acids such as acetic acid, propionic acid, butyric acid, oxalic acid, succinic acid, benzoic acid, maleic acid, sulfuric acid, benzene sulfonic acid, phosphoric acid, etc. Of such ester reactants, the acetates are preferred, since the addition of such acetate to the crude formic acid distillate does not involve an increase in the kinds of acids present in the mixture. The alcohol and ester reactants just mentioned are herein referred to generically as being "alcohol source-materials," since all of said reactants either are alcohols or are capable of hydrolysis to form alcohols during use in the process.

The reaction to produce the formic acid ester occurs most readily in the presence of an esterification catalyst, and such catalyst is preferably employed. However, the reaction may, in some instances, be carried out satisfactorily without the addition of a catalyst. A number of catalysts which may be used in the process are known. Examples of such catalysts are hydrochloric acid, sulfuric acid, benzene sulfonic acid, toluene sulfonic acid, etc. The catalyst is usually employed in minor amount, e. g. in amount corresponding to between 0.1 and 5 per cent of the weight of the reaction mixture.

The catalyst and the organic reactant, i. e. one of the above alcohols or esters, are added to the crude formic acid distillate and the mixture is heated to fractionally distill therefrom the resultant formic acid ester as it is formed. The organic reactant is usually employed in amount corresponding to form 0.8 to 1.3 per cent of the chemical equivalent of the formic acid present in the crude formic acid distillate, but it may be used in smaller or larger proportion if desired. In most instances, it is added in amount slightly exceeding the chemical equivalent of formic acid, since a small proportion of alcohol usually distills together with the formic acid product. It may be added either prior to or during the operation of forming and distilling from the reaction mixture the formic acid ester product.

The distillate usually is a formic acid ester of good quality. However, it may contain a small amount, e. g. from 3 to 10 per cent, of the corresponding alcohol and moisture. It may readily be freed of these impurities by washing with water and drying.

The mixture remaining after distillation of the formic acid ester product contains the acetic acid in higher concentration than in the original mixture and in a form which is relatively free of formic acid and which may readily be purified in known ways. Usually this residual material is fractionally distilled to recover the acetic acid in purified form. In most instances a considerable amount of tarry material is obtained as a residue from this distillation. The formation of this tarry residual material indicates that the crude formic acid distillate contains reactive and decomposable ingredients, the identity of which is not known.

The invention permits the production of a pure formic acid ester and the recovery of purified acetic acid in good yield from the crude formic acid distillate.

The following examples describe certain ways in which the principle of the invention has been applied, but are not to be construed as limiting its scope:

*Example 1*

Crude formic acid distillate, having the composition hereinbefore stated, was treated in countercurrent manner and at an elevated temperature with ethyl acetate. A considerable amount of ethyl formate was formed and distilled from the mixture.

*Example 2*

Approximately 134 pounds (2.2 moles) of isopropyl alcohol and 4.6 pounds (0.047 mole) of concentrated sulphuric acid were added to 233 pounds of the formic acid-containing fraction of dehydrated pyroligneous acid, which fraction consisted of 14.7 per cent by weight of water, 41.2 per cent of formic acid and a total of 44.1 per cent of acetic acid and other ingredients of unknown identity. The mixture was heated at temperatures ranging from 86° to 108° C. in such manner as to fractionally distill therefrom isopropyl formate as it was formed. Two fractions of distillate were collected. The first fraction, amounting to 162 pounds, distilled at temperatures of from 64° to 70° C. It contained approximately 94 per cent by weight of isopropyl formate and about 6 per cent of isopropyl alcohol and moisture. Upon washing this fraction free of the alcohol with water and drying, substantially pure isopropyl formate is obtained. As the second fraction of distillate there was obtained 36 pounds of liquid material distilling at temperatures of from 70° to 90° C. This fraction was found to contain 45 per cent by weight of isopropyl formate, 30 per cent of isopropyl acetate, and 13 per cent of isopropyl alcohol, the remainder being largely water. A total of 168.5 pounds (1.92 moles) or 92 per cent of the theoretical yield, of isopropyl formate was obtained. As the residue from the distillation there was obtained 126 pounds of liquor. A portion of this liquor was fractionally distilled, whereby acetic acid of greater than 95 per cent purity was obtained in amount corresponding to 40 per cent of the weight of the liquor subjected to the distillation. A considerable amount of tarry material remained as a residue from this latter distillation.

*Example 3*

1500 grams of crude formic acid distillate (which analyzed as containing 45 per cent by weight of formic acid, 14.5 per cent of water, and 40.5 per cent of other ingredients, principally acetic acid) was treated with 885 grams of isopropyl alcohol and 24 grams of sulphuric acid. The mixture was heated to fractionally distill therefrom isopropyl formate as it was formed. As the first fraction of distillate, there was obtained 1051.2 grams of material distilling at between 61.7° and 63.6° C. This fraction was isopropyl formate of approximately 95.4 per cent purity, the principal impurities being isopropyl alcohol and water. Heating was continued until the distilling temperature had risen to approximately 100° C. in order to free the residual material of isopropyl formate and isopropyl alcohol. As the still residue there was obtained 1062 grams of liquor which contained 52.2 per cent by weight of acetic acid and 15.9 per cent of formic acid. The isopropyl formate product of 95.4 per cent purity was washed with 4 portions of water, each equal to ¼ the volume of said fraction of distillate, and dried. The dried product was isopropyl formate of greater than 99 per cent purity.

*Example 4*

448.9 grams of crude formic acid distillate (containing 43.4 per cent of formic acid, 14.3 per cent of water, and 42.3 per cent of acetic acid and other ingredients) was treated with approximately 600 grams of isopropyl acetate of 90 per cent purity (containing 540 grams of pure isopropyl acetate) and 1 gram of sulphuric acid. The mixture was heated to distill isopropyl formate therefrom as formed. As the fraction distilling at temperatures between 67.5° and 71° C. there was obtained 259.9 grams of isopropyl formate of approximately 94.7 per cent purity. The product was washed with water, dried, and analyzed. The dried product was isopropyl formate of 99.8 per cent purity.

Other modes of applying the principle of the invention may be employed instead of those explained, change being made as regards the method herein disclosed, provided the step or steps stated by any of the following claims, or the equivalent of such stated step or steps, be employed.

We therefore particularly point out and distinctly claim as our invention:

1. The method which comprises treating a mixture consisting largely of formic acid, acetic acid and water with a source-material selected from the class consisting of methyl alcohol, ethyl alcohol, propyl alcohol, isopropyl alcohol, allyl alcohol, secondary butyl alcohol and the esters of said alcohols of boiling points higher than those of corresponding esters of formic acid, said alcohol source-material being employed in amount corresponding to between 0.8 and 1.3 of the chemical equivalent of the formic acid, and heating the mixture to fractionally distill therefrom an ester of formic acid in concentrated form, whereby the acetic acid is also concentrated and is rendered relatively free of formic acid so that it may readily be further purified by distillation.

2. The method which comprises treating a wood-distillate fraction containing from 40 to 50 per cent by weight of formic acid and from 10 to 15 per cent of water, the remainder being largely acetic acid, with an esterification catalyst and a source-material selected from the class consisting of methyl alcohol, ethyl alcohol, propyl alcohol, isopropyl alcohol, allyl alcohol, secondary butyl alcohol and the esters of said alcohols of boiling points higher than those of corresponding esters of formic acid, said alcohol source-material being employed in amount corresponding approximately to the chemical equivalent of the formic acid, and heating the mixture to fractionally distill therefrom an ester of formic acid in concentrated form, whereby the acetic acid is also concentrated and is obtained in a form capable of purification by distillation.

3. The method as described in claim 2 wherein the source-material is an ester.

4. The method as described in claim 2 wherein the source-material is an ester of acetic acid.

5. The method as described in claim 2 wherein the source-material is ethyl acetate.

6. The method as described in claim 2 wherein the source-material is isopropyl acetate.

7. The method as described in claim 2 wherein the source-material is an alcohol.

8. The method as described in claim 2 wherein the source-material is isopropyl alcohol.

9. The method which comprises treating a wood-distillate fraction which contains from 40 to 50 per cent by weight of formic acid and from 10 to 15 per cent of water, the remainder being largely acetic acid, with an esterification catalyst and a source-material selected from the class consisting of methyl alcohol, ethyl alcohol, propyl alcohol, isopropyl alcohol, allyl alcohol, secondary butyl alcohol, and the esters of said alcohols of boiling points higher than those of the corresponding esters of formic acid, said alcohol source-material being employed in amount corresponding approximately to the chemical equivalent of the formic acid, and heating the mixture to fractionally distill therefrom and obtain as separate fractions a concentrated ester of formic acid and acetic acid in concentrated form.

ALFRED A. REITER.
FLOYD L. BEMAN.

REFERENCES CITED

The following references are of record in the file of this patent:

UNITED STATES PATENTS

| Number | Name | Date |
|---|---|---|
| 1,993,259 | Buc | Mar. 5, 1935 |
| 1,647,676 | Retze | Nov. 1, 1927 |
| 1,959,547 | Recard et al. | May 22, 1934 |
| 2,156,345 | Martin | May 2, 1939 |
| 2,042,218 | Evans et al. | May 26, 1936 |
| 121,586 | Cavarly | Dec. 5, 1871 |
| 1,624,810 | Suida | Apr. 12, 1927 |
| 1,839,894 | Ricard et al. | Jan. 5, 1932 |
| 1,696,432 | Dreyfus | Dec. 25, 1928 |
| 2,175,879 | Contour | Oct. 10, 1939 |
| 2,157,143 | Othmer | May 9, 1939 |
| 2,129,684 | Gordon et al. | Sept. 13, 1938 |
| 2,050,235 | Othmer | Aug. 4, 1936 |
| 2,049,440 | Gordon | Aug. 4, 1936 |
| 93,012 | Schleiffer | July 27, 1869 |

OTHER REFERENCES

Thorpe, "Dict. of Applied Chem.," vol. 1, (Rev. and Enlarged Ed., 1921) p. 11.

Brannt, "The Mann. of Vinegar and Acetates, Cider, and Fruit-Wines," (1890), pp. 245–247.